United States Patent Office 2,730,481
Patented Jan. 10, 1956

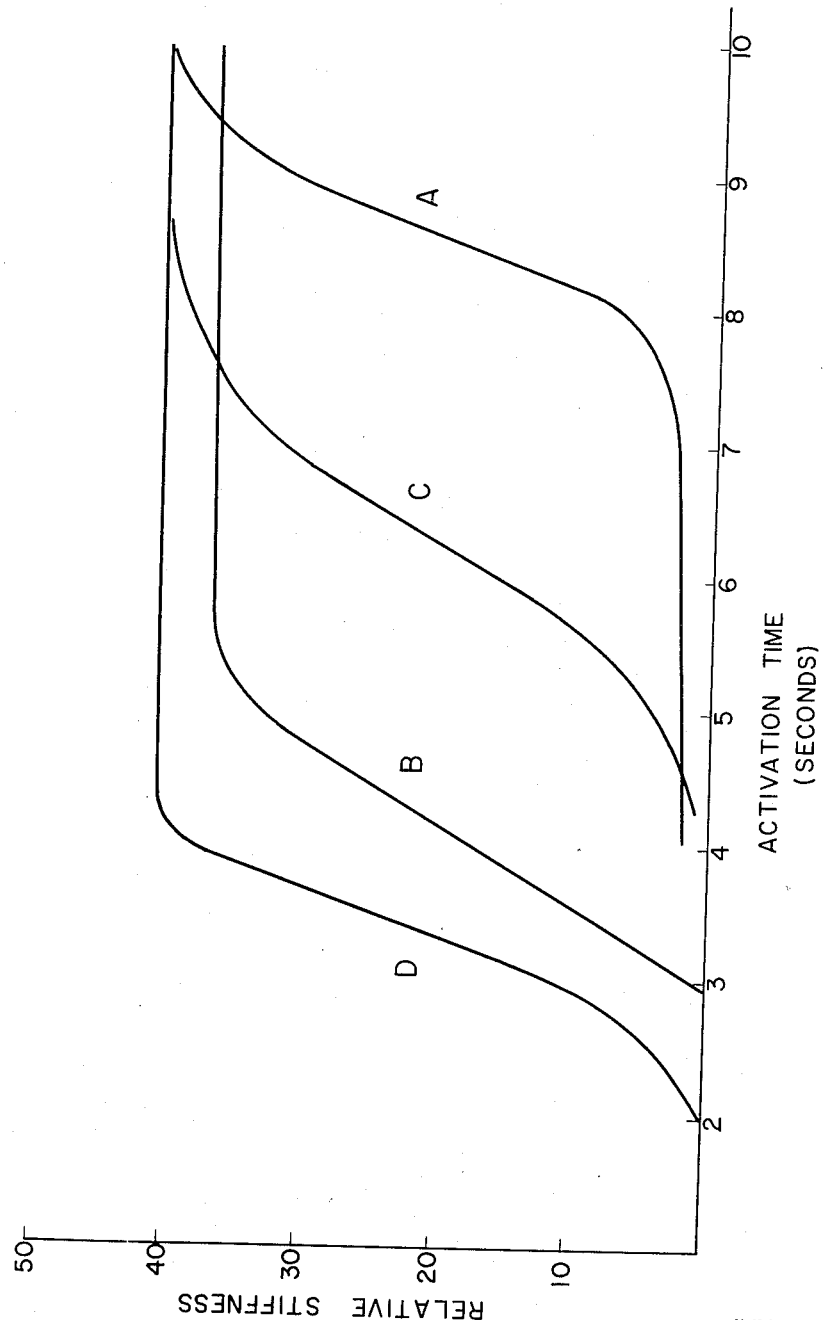

2,730,481

POLYMERIZATION BY DIELECTRIC HEATING USING INORGANIC SALTS AS HEATING ASSISTANTS

Bruce F. Day, Wilmington, Del., assignor to The Celastic Corporation, Arlington, N. J., a corporation of Delaware Application October 29, 1952, Serial No. 317,527

6 Claims. (Cl. 154—126.5)

This invention relates to the curing of resinous material and particularly to the curing by means of dielectric heating.

It is well known that some resin compositions require heating to cause them to undergo condensation polymerization or otherwise to be cured. The system of applying heat has taken various forms, one of the more modern being the use of dielectric heating. This type of heating utilizes a high voltage, high-frequency electrical power source which produces an electromagnetic field into which is placed a composition of high dielectric constant and high dielectric loss, thus heating the composition. Such dielectric heating can produce high temperatures in a very short time. However, control of the rate of heating is not always entirely satisfactory. Thus, the use of a certain dielectric heating apparatus to heat a certain composition to 300° C., may require 10 seconds, and in order to change the length of time, the electric characteristics of the apparatus may have to be changed, such as by changing the frequency or the voltage.

In British Patent 607,690, there is disclosed the process of utilizing certain organic compounds as heating assistants in dielectric heating. This British patent discloses and claims a series of nitrated organic compounds utilized to increase the rate of heating of rubber being vulcanized in a dielectric heater. Although such compounds may be incorporated in rubber without harming its properties after vulcanization, many of these nitro-compounds are undesirable if used in synthetic resins undergoing a heat treatment.

It is an object of this invention to provide inorganic heating assistants which may increase the rate by which compositions may be heated by dielectric means. It is also an object of this invention to provide a process for the utilization of inorganic salts in conjunction with synthetic resins in order to cure such resins by dielectric heating in a matter of a few seconds. A particular object of this invention is to provide a process for stiffening the uppers of shoes by dielectric heating which will not harm the leather of the shoe. The experience in the past has been that the use of dielectric heating for curing resin-impregnated materials used in the stiffening of shoe uppers has often resulted in damage to the leather of the shoe even when the period of dielectric heating was as low as 10–12 seconds. It is therefore an object of this invention to shorten this time of dielectric heating so that the proper stiffness may be obtained without damage to the leather through overheating.

The following examples will more fully illustrate and explain the process of this invention.

*Example 1.*—A solution was prepared by mixing 47 grams of acetone with 25 grams of a copolymer of 88% polyvinyl chloride–12% polyvinyl acetate. After solution was complete, there were added 25 grams of polyethylene glycol dimethacrylate, ½ gram (2% based on the polyethylene glycol dimethacrylate present) of benzoyl peroxide as a catalyst, and 0.5% (based on the polyethylene glycol dimethacrylate) of para-phenylphenol as an inhibitor. Pieces of flannel (6 oz./sq. yd.) approximately 4 inches by 12 inches were immersed in the solution just described, and the wet flannel was stripped manually between 2-inch stainless steel rolls spaced about 35 mils apart. After the flannel had dried it was determined that the flannel was loaded to approximately 20 oz./sq. yd. The dried flannel was cut into 1 inch by 3 inch strips which were to be subjected to dielectric heating. The dielectric heating apparatus was a direct field machine operating at 1600 volts and 115 megacycles. The test strips of impregnated flannel were inserted between similar size strips of shoe lining and doubler cloth, and this laminate enclosed between two pieces of polytetrafluoroethylene resin. This five-layer sandwich was inserted in the dielectric machine and held in place under 2 to 3 pounds per sq. in. pressure by a holder made of polystyrene, which is a material of low dielectric loss. After being subjected to a period of dielectric heating, known herein as the "activation time," the test strips of flannel laminate were allowed to cool between glass plates, after which they were tested for stiffness on an Olsen-Tinius Stiffness Tester by the method generally described in ASTM–D–747. The relative values of stiffness were determined by using a three-pound load and a ½-inch span and measuring the force required to produce a 25° bend. The results of the experiments are shown on the drawing attached to this description. The drawing is a graph of the relative stiffness of the test strips versus the time required to achieve that stiffness by dielectric heating. The relative stiffness values are not absolute values, but rather, are arbitrary numbers such that a material with a stiffness of 40 is twice as stiff as a material with a stiffness of 20. A stiffness of 40 corresponds to the stiffness obtained with a commercial product known as "Celastic" 40 which is customarily used in women's shoes. A stiffness of 50 compares with that of "Celastic" 115 which is customarily used in light-weight men's shoes. Curve A shows the results obtained from a test strip prepared exactly as described above. Curve B shows the effect produced by the incorporation of 9% of zinc chloride in the impregnating solution, based on the total weight of polyethylene glycol dimethacrylate and vinyl chloride-vinyl acetate copolymer. It can be seen that the time of heating to produce the same stiffness is reduced from about 9 seconds in curve A to about 5 seconds in curve B by the addition of zinc chloride as a heating assistant.

Curve C is the result of heating a strip of flannel impregnated as described in Example 1 except that ½ gram of alpha,alpha'-azobis(isobutyronitrile) was used as a catalyst in place of ½ gram of benzoyl peroxide. Curve D shows the effect of adding 2% of potassium thiocyanate, in addition to the azonitrile catalyst, based on the total weight of polyethylene glycol dimethacrylate and vinyl chloride-vinyl acetate copolymer, to the impregnating solution described in curve C. The time of heating to produce the same stiffness was reduced from about 9 seconds in curve C to about 4 seconds in curve D by the addition of potassium thiocyanate as a heating assistant.

Many other salts have been tried and found to be useful in decreasing the time of dielectric heating which will produce a desired stiffness. The accompanying table shows other salts which have been tried, and their effect as heating assistants in the stiffening of flannels impregnated with resinous compositions which are heat curable.

TABLE
Inorganic salts tested as heating assistants

| Salt | Formula | Plastic [a] | Catalyst [b] | ΔT [c] (sec.) | Conc. [d] (percent) |
|---|---|---|---|---|---|
| Zinc chloride | $ZnCl_2$ | Composition A | BPO | 4 | 9 |
| Zinc bromide | $ZnBr_2$ | do | BPO | 3 | 15 |
| Stannic chloride | $SnCl_4.5H_2O$ | do | BPO | 4 | 9 |
| Potassium thiocyanate | KCNS | do | azonitrile | 5 | 2 |
| Stannous chloride | $SnCl_2.2H_2O$ | do | do | 3–4 | 9 |
| Aluminum chloride | $AlCl_3.6H_2O$ | do | do | 3 | 3 |
| Calcium chloride | $CaCl_2$ | do | do | 4 | 3 |
| Magnesium chloride | $MgCl_2.6H_2O$ | do | do | 6 | 9 |
| Silver nitrate | $AgNO_3$ | do | do | 3 | 10 |
| Zinc sulfate | $ZnSO_4.7H_2O$ | do | do | 3 | 13 |
| Manganese chloride | $McCl_2.4H_2O$ | do | do | 5–6 | 13 |
| Cobaltous chloride | $CoCl_2.6H_2O$ | do | do | 4–5 | 13 |
| Nickelous chloride | $NiCl_2.6H_2O$ | do | do | 4–5 | 13 |
| Chromium chloride | $CrCl_3.6H_2O$ | do | do | 2 | |
| Lithium chloride | LiCl | Composition B | BPO | 2–3 | 3 |
| Strontium chloride | $SrCl_2.6H_2O$ | do | BPO | 2–3 | 3 |
| Calcium sulfate | $CaSO_4.2H_2O$ | Composition A | BPO | 0 | [e] 18 |
| Sodium chloride | NaCl | do | BPO | 0 | [e] 9 |
| Copper chloride | $CuCl_2.2H_2O$ | do | BPO and azonitrile | 0 | 15 |
| Ferric chloride | $FeCl_3$ | do | BPO and azonitrile | 0 | 15 |
| Ferric nitrate | $Fe(NO_3)_3.9H_2O$ | Composition B | azonitrile | 0 | 13 |
| Ferrous sulfate | $FeSO_4.7H_2O$ | do | do | 0 | 3 |
| Lead acetate | $Pb(OAc)_2.3H_2O$ | do | do | 0 | [f] 13 |
| Zinc acetate | $Zn(OAc)_2.2H_2O$ | do | do | 0 | [f] 3 |

[a] Composition A was composed of 25 parts of a copolymer (88% polyvinyl chloride–12% polyvinyl acetate) and 25 parts polyethylene glycol dimethacrylate, the plastic mixture being dissolved in 47 parts of acetone and containing ½ part of para-phenylphenol. Composition B was composed of 25 parts of polyvinyl acetate and 25 parts of polyethylene glycol dimethacrylate; the plastic mixture being dissolved in 85 parts of methanol. All catalyst concentrations were 2% based on polyethylene glycol dimethacrylate.
[b] BPO = Benzoyl peroxide; azonitrile = alpha, alpha'-azobis (isobutyronitrile).
[c] The value of ΔT is the approximate difference between the activation times for a sample containing the salt and a control of the same loading containing no salt (activation time of sample without salt was approximately 10–12 seconds in all cases); all activations at 1600 volts using a liner and doubler.
[d] The concentration given is the percentage of salt producing the optimum result (the highest stiffness value in the shortest time).
[e] These salts are insoluble in the system.
[f] These salts are probably insoluble in the system.

It will be seen that salts which are insoluble in the impregnating solution are of no value as heating assistants.

Some of the salts shown in the table are excellent heating assistants but they destroy the catalyst and therefore inhibit polymerization. These inhibitors include copper and iron salts such as copper chloride, ferric chloride, ferric nitrate and ferrous sulfate. These materials have a structure which enables them to participate easily in oxidation-reduction-type reactions, and it is believed that such a structure cause these salts to destroy the radicals produced by the peroxide and the azonitrile type of catalysts.

*Example 2.*—Pure polyethylene glycol dimethacrylate containing 10% of anhydrous zinc chloride and 3% of benzoyl peroxide was used to impregnate flannel. Excess liquid was then stripped from the flannel and the cloth was subjected to dielectric heating while still wet and in the same manner as described in Example 1. Activation time was about 5 seconds, while the activation time of a flannel impregnated with the same material, but without the zinc chloride salt, was about 17 seconds.

This example shows that water which may be combined with the metallic salt has no effect on the heating assistance, and that anhydrous salts give the same degree of assistance.

*Example 3.*—The procedure of Example 1 was followed using different resins to determine the effectiveness of heating assistants incorporated therein. In separate experiments the resins tested were styrene-modified alkyd resins, the condensation product of maleic anhydride and ethylene glycol, modified by about 35% of styrene. One such resin tested is commercially sold by Rohn & Haas Company under the name "Paraplex" P–43, and the other resin tested is commercially sold by Naugatuck Chemical Co. under the name of "Vibrin" 108A. Each resin was catalyzed with 4% of benzoyl peroxide, and also contained 10% of zinc chloride. Control experiments were run on samples which did not contain zinc chloride but which otherwise were the same. Flannel was impregnated with these solutions, stripped of excess liquid, placed between liner and doubler cloths and activated in a dielectric heater at 1600 volts. The time of activation was 20 seconds in the samples containing zinc chloride, and was 26 seconds in the samples that contained no zinc chloride. Thus, the inorganic salts have value as heating assistants for alkyd resins.

*Example 4.*—To test the value of the inorganic salts as heating assistants for aminoplasts, a urea-formaldehyde resin was used having a formaldehyde to urea, (F/U), ratio of 1.8, 70% solids content, and a pH of 8.9. To 100 grams of this resin was added 7 grams of zinc chloride in 10 cc. of water (pH 3.4). The resin solution then had a pH of 5.6. As a control solution, another 100-gram portion of the same urea-formaldehyde resin was mixed with 8 cc. of water and 2 cc. of dilute hydrochloric acid to give a final pH of 5.0. Separate pieces of flannel were impregnated with these solutions, stripped of excess liquid and dried one hour in a vacuum at 25° to 64° C. The materials were then activated by dielectric heating in the same fashion as described in Example 1. The activation time was considerably shorter in the sample containing zinc chloride than in the sample without zinc chloride, the former being 22 seconds while the latter was 37 seconds.

In all of the foregoing examples, the impregnated flannel was loaded with resinous material so that 1 inch by 3 inch impregnated strips weighed approximately 1.35 grams. However, if the material is loaded with a greater amount of resin, the activation time will be shorter to reach a certain value of stiffness, or as a corollary, the stiffness will be greater for the same activation time. Thus, 1 inch by 3 inch strips of flannel were impregnated with a solution as described in Example 1, containing no inorganic salt heating assistant. Four strips were loaded with different amounts of resin; namely, 0.87 gram, 1.33 grams, 1.57 grams, and 1.78 grams. The results of subjecting these flannel strips to the action of the dielectric heater at 1600 volts and 115 megacycles are as follows:

(a) In the strip weighing 0.87 gram there was substantially no positive value of stiffness below an activation time of 9 seconds, and a maximum value of relative stiffness of about 20 was reached at an activation time of 12 seconds.

(b) In the strip weighing 1.33 grams (approximately the standard weight used in the foregoing examples) there was substantially no positive value of stiffness below an activation time of 7 seconds, and a maximum value of relative stiffness of about 43 was reached at an activation time of about 11 seconds.

(c) In the strip weighing 1.57 grams there was substantially no positive value of stiffness below an activation time of 5 seconds, and a maximum value of relative stiffness of 54 was reached at an activation time of 10 seconds.

(d) In the strip weighing 1.78 grams there was substantially no positive value of stiffness below an activation time of 4 seconds, and a maximum value of relative stiffness of 65 was reached at an activation time of 9 seconds.

The energy level of the dielectric heater and the loading of the stiffening material as explained in the foregoing examples will produce the stiffness which has been found to be desirable for employment in high-grade shoes. Other embodiments of this invention may require slightly different energy levels, activation times, or amount of resin in the impregnated material. For example, dielectric heaters designed to be used in actual manufacture of shoes employ electrodes curved to fit the portion of the shoe being stiffened. Such heaters are not perfectly symmetrical and are not as efficient as the flat, parallel-plate heater described in the examples herein. Thus, it has been found that voltages of about 2800 volts were necessary in actual manufacture to produce approximately the same heating as is produced by 1600 volts in the parallel-plate strip heater of the examples.

I claim:

1. A process for stiffening a flannel material which comprises impregnating said flannel with a solution of a mixture of polyethylene glycol dimethacrylate and a copolymer of vinylchloride and vinylacetate, said solution containing a catalytic amount of benzoyl peroxide and about 10%, based on the polyethylene glycol dimethacrylate, of zinc chloride, and thereafter subjecting the impregnated flannel to dielectric heating for a period of time sufficient to stiffen the impregnated flannel.

2. A process for stiffening a flannel material which comprises impregnating said flannel with a solution of a mixture of polyethylene glycol dimethacrylate and a polyvinyl acetate, said solution containing a catalytic amount of alpha,alpha'-azobis(isobutyronitrile) and about 2%, based on the polyethylene glycol dimethacrylate, of potassium thiocyanate, and thereafter subjecting the impregnated flannel to dielectric heating for a period of time sufficient to stiffen the impregnated flannel.

3. In the process of stiffening the upper of a shoe by dielectrically heating an upper of a shoe containing a shoe stiffener comprising a textile material impregnated with a synthetic material capable of being polymerized into a stiff solid polymer by the application of heat in the presence of a polymerization catalyst, the method of shortening the period of dielectric heating required to cause the polymerization of said synthetic material by the steps comprising impregnating said textile material with a liquid solution of said synthetic material and said catalyst and containing as an added ingredient 1% to 15% by weight of said synthetic material of an inorganic salt which is soluble in said solution and which is selected from the group consisting of zinc chloride, zinc bromide, zinc sulfate, potassium thiocyanate, stannous chloride, stannic chloride, aluminum chloride, calcium chloride, magnesium chloride, silver nitrate, manganese chloride, cobaltous chloride, nickelous chloride, chromium chloride, lithium chloride and strontium chloride, removing excess liquid from the impregnated material, incorporating the impregnated material into the upper of a shoe and subjecting said upper to the action of a high frequency electric field for a number of seconds sufficient to polymerize said synthetic material and thereby to stiffen said upper of a shoe.

4. A process for stiffening the upper of a shoe comprising treating flannel with a liquid solution comprising a mixture of polyethylene glycol dimethacrylate and polyvinyl acetate, a catalytic amount of benzoyl peroxide and 1% to 15%, based on the weight of said mixture of polyethylene glycol dimethacrylate and polyvinyl acetate, of an inorganic salt from the group consisting of zinc chloride, zinc bromide, zinc sulfate, potassium thiocyanate, stannous chloride, stannic chloride, aluminum chloride, calcium chloride, magnesium chloride, silver nitrate, manganese chloride, cobaltous chloride, nickelous chloride, chromium chloride, lithium chloride and strontium chloride, removing excess liquid from the treated flannel, assembling said treated flannel with other parts of the upper of a shoe, and subjecting the resulting assembly to the action of a high frequency electrical field for a time sufficient to polymerize said polyethylene glycol dimethacrylate and polyvinyl acetate and thereby to stiffen said flannel.

5. A proces for stiffening the upper of a shoe comprising treating flannel with a liquid solution comprising a polymerizable styrene-modified alkyd resin, a catalytic amount of benzoyl peroxide, and about 10% of zinc chloride based on the weight of said alkyd resin, removing excess liquid from the treated flannel, assembling said treated flannel with other parts of the upper of a shoe, and subjecting the resulting assembly to the action of a high frequency electrical field for a time sufficient to polymerize said alkyd resin and thereby to stiffen said flannel.

6. A process for stiffening the upper of a shoe comprising treating flannel with a liquid solution of a polymerizable urea-formaldehyde resin and 1% to 15% of zinc chloride based on the weight of said urea-formaldhehyde resin, removing excess liquid from the treated flannel, assembling said treated flannel with other parts of the upper of a shoe, and subject the resulting assembly to the action of a high-frequency electrical field for a time sufficient to polymerize said urea-formaldehyde resin, and thereby to stiffen said flannel.

References Cited in the file of this patent

UNITED STATES PATENTS

| 2,280,771 | Dufour | Apr. 28, 1942 |
| 2,364,790 | Hemming | Dec. 12, 1944 |
| 2,405,037 | Hsu | July 30, 1946 |
| 2,476,282 | Castellan | July 19, 1949 |
| 2,611,195 | Brophy et al. | Sept. 23, 1952 |

FOREIGN PATENTS

| 517,798 | Great Britain | Feb. 8, 1940 |
| 567,380 | Great Britain | Feb. 12, 1945 |